(12) United States Patent
Yahia et al.

(10) Patent No.: US 12,515,498 B2
(45) Date of Patent: Jan. 6, 2026

(54) COOLANT CIRCUIT OF A VEHICLE ADAPTED TO FAST CHARGING OF A STORAGE DEVICE

(71) Applicant: Valeo Systemes Thermiques, Le Mesnil Saint-Denis (FR)

(72) Inventors: Mohamed Yahia, Le Mesnil Saint-Denis (FR); Stefan Karl, Le Mesnil Saint-Denis (FR); Bertrand Nicolas, Le Mesnil Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 186 days.

(21) Appl. No.: 17/785,569

(22) PCT Filed: Dec. 2, 2020

(86) PCT No.: PCT/FR2020/052246
§ 371 (c)(1),
(2) Date: Jun. 15, 2022

(87) PCT Pub. No.: WO2021/123537
PCT Pub. Date: Jun. 24, 2021

(65) Prior Publication Data
US 2023/0019811 A1    Jan. 19, 2023

(30) Foreign Application Priority Data

Dec. 16, 2019 (FR) ..................................... 1914531

(51) Int. Cl.
*B60H 1/00* (2006.01)
*B60H 1/32* (2006.01)

(52) U.S. Cl.
CPC ....... *B60H 1/3205* (2013.01); *B60H 1/32281* (2019.05)

(58) Field of Classification Search
CPC ................ B60H 1/32281; B60H 1/323; B60H 1/00278; B60H 1/3223; B60H 1/143;
(Continued)

(56) References Cited

U.S. PATENT DOCUMENTS 10,443,945 B2    10/2019    Goel et al.

FOREIGN PATENT DOCUMENTS

| DE | 102011000796 A1 | * | 8/2012 | ............. B60H 1/004 |
| DE | 102016201835 A1 | * | 8/2017 | ......... B60H 1/00278 |

(Continued)

OTHER PUBLICATIONS

International Search Report and Written Opinion in corresponding International Application No. PCT/FR2020/052246, mailed Mar. 16, 2021 (12 pages).

(Continued)

*Primary Examiner* — Jianying C Atkisson
*Assistant Examiner* — Esmeralda Arreguin-Martinez
(74) *Attorney, Agent, or Firm* — Osha Bergman Watanabe & Burton LLP (57) ABSTRACT

A circuit for circulating refrigerant in a vehicle includes a main branch including a main heat exchanger comprising at least one inlet for refrigerant. The circuit further includes a first branch and a second branch that extend between a point of divergence and a point of convergence. The first branch includes a first compression device, a first expansion member and a first heat exchanger configured to thermally treat an electrical storage device of the vehicle. The second branch includes a second compression device, a second expansion member and a second heat exchanger configured to thermally treat a passenger compartment of the vehicle. The circuit further includes a high-pressure line that includes a first portion extending between an outlet of the first compression device and the inlet. The high-pressure line
(Continued)

includes a second portion extending between an outlet of the second compression device and the inlet.

3 Claims, 4 Drawing Sheets

(58) Field of Classification Search
CPC .... B60H 1/00385; F25B 2400/06; F25B 5/02; F25B 2400/075; F25B 39/04; F25B 2339/0444
See application file for complete search history.

(56) References Cited

FOREIGN PATENT DOCUMENTS

| | | |
|---|---|---|
| FR | 3075705 A1 | 6/2019 |
| FR | 3080329 A1 | 10/2019 |
| WO | 2019/122713 A1 | 6/2019 |
| WO | 2019/150039 A1 | 8/2019 |

OTHER PUBLICATIONS

Office Action issued in counterpart Chinese Patent Application No. 202080093308.9 mailed May 27, 2025 (12 pages).

\* cited by examiner

COOLANT CIRCUIT OF A VEHICLE ADAPTED TO FAST CHARGING OF A STORAGE DEVICE

The field of the present invention is that of refrigerant circuits for vehicles, in particular for motor vehicles. The subject matters of the invention are a refrigerant circuit equipping a motor vehicle which is provided with an electrical storage device and a method for controlling a temperature of the electrical storage device implementing such a circuit.

Motor vehicles are currently equipped with a refrigerant circuit used to heat or cool various zones or various components of the vehicle. It is particularly known for this refrigerant circuit to be used to thermally treat an airflow sent into the interior of the vehicle equipped with such a circuit.

In another application of this circuit, it is known for it to be used to cool an electrical storage device of the vehicle, said device being used to provide energy to an electric motor capable of moving the vehicle. The refrigerant circuit thus provides the energy capable of cooling the electrical storage device when it is used during driving phases. The refrigerant circuit is thus designed to cool this electrical storage device for temperatures that remain moderate.

It is also known practice for the electrical storage device of the vehicle to be charged by connecting it for several hours to the domestic grid. This long charging technique allows the temperature of the electrical storage device to be kept below a certain threshold, which avoids having to use any system for cooling the electrical storage device.

A new charging technique has recently been developed. It involves charging the electrical storage device at a high voltage and current, so as to charge the electrical storage device over a time of at most a few tens of minutes. A consequence of this rapid charging is heating of the electrical storage device, which must be managed. Furthermore, the possibility that the occupants of the vehicle remain inside the vehicle for all or some of the aforementioned charging time must be considered. The vehicle interior then also needs to be thermally treated during this rapid charging in order to maintain acceptable comfort conditions for the occupants, particularly when the temperature outside the vehicle exceeds 30° C.

Document FR3075705 describes a circuit designed to meet these objectives. This circuit comprises a main branch which is provided with a main heat exchanger and which extends between a point of convergence and a point of divergence. This circuit also comprises a first branch and a second branch which run in parallel with one another between the point of divergence and the point of convergence. The first branch and the second branch are both in series with the main branch.

It is possible to bring the two compression devices into operation when a phase of rapid charging of the electrical storage device is activated, while the occupants remain in the vehicle and it is necessary to cool the vehicle interior also.

In the latter instance, the circuit comprises a high-pressure line which extends between the two compression devices and the two expansion members. The high-pressure line comprises a first part which extends between an outlet of the first compression device and a point of convergence of the first branch and of the second branch, a second part which extends between an outlet of the second compression device and the point of convergence, and a common part which extends between the point of convergence and an inlet point at which the refrigerant enters the main heat exchanger.

The first part, the second part and the common part jointly form an assembly which is interposed between the outlets of the two compression devices and the inlet point at which the refrigerant enters the main heat exchanger.

Significant pressure drops arise inside this assembly formed of these three circuit parts and these pressure drops are detrimental to the efficiency of the circuit as they reduce the coefficient of performance thereof. It is found in particular that these pressure drops are too great inside the common part, interposed between the point of convergence and the inlet point at which the refrigerant enters the main heat exchanger, and this is detrimental to proper operation of the circuit.

In addition, and again when the two compression devices are operating at the same time, a refrigerant pressure prevailing in the high-pressure portion of the circuit is liable to exceed a threshold pressure beyond which the rotational speed of the compression devices is limited in order to avoid any overpressure and to limit the risk of an accompanying component rupturing.

The present invention proposes a refrigerant circuit equipping a vehicle which is configured to simultaneously thermally condition an electrical storage device of a vehicle and thermally condition an interior of the vehicle, the circuit comprising at least two compression devices, the circuit comprising a high-pressure line which is arranged such that any pressure drops affecting it are minimized and so that the pressure of the refrigerant inside the circuit remains below a threshold pressure, in any mode of operation of the circuit whatsoever, including when the two compression devices that the circuit comprises are in operation simultaneously.

A circuit of the present invention is a motor vehicle circuit through which a refrigerant is intended to pass. The circuit comprises at least a main branch comprising at least a main heat exchanger comprising at least an inlet for refrigerant. The circuit also comprises a first branch and a second branch which extend between a point of divergence and a point of convergence and which are both positioned in series with the main branch. The first branch comprises at least a first compression device, a first expansion member and a first heat exchanger which is configured to thermally condition an electrical storage device of the vehicle. The second branch comprises at least a second compression device, a second expansion member and a second heat exchanger configured to thermally condition an interior of the vehicle. The circuit comprises a high-pressure line which comprises a first portion extending between an outlet of the first compression device and the inlet of the main heat exchanger and which comprises a second portion extending between an outlet of the second compression device and the inlet of the main heat exchanger. The first portion is of a first length and the second portion is of a second length. A first distance separates the outlet of the first compression device from the point of convergence and a second distance separates the outlet of the second compression device from the point of convergence.

According to the present invention, the first distance is greater than half the first length, and the second distance is greater than half the second length.

The circuit advantageously comprises any one at least of the following technical features, considered alone or in combination:

the point of convergence is closer to the inlet via which the refrigerant enters the main heat exchanger than to any one of the outlets of the compression devices, it will be appreciated that such proximity minimizes the pressure drops experienced by the refrigerant between the compression devices and the main heat exchanger, specifically it will be appreciated that the shorter the common part of the piping between, on the one hand, the first compression device and the main heat exchanger and, on the other hand, the second compression device and the main heat exchanger, the lower these pressure drops will be, it will be appreciated that the common part has a length that is as short as possible, the present invention therefore proposes to make this common part as small as possible, or even, in one of these embodiments, to render it non-existent, the point of divergence is the zone of the circuit where the main branch splits into two, forming the first branch and the second branch, the point of convergence is, for example, the zone of the circuit where the first branch and the second branch meet to form the main branch. The point of convergence is, for example, also the zone of the circuit where the refrigerant coming from the first compression device and the refrigerant coming from the second compression device mix together, the second compression device is independent of the first compression device in the sense that one of the compression devices can be active while the other compression device is inactive, or else can run simultaneously at different rotational speeds, the refrigerant is, for example, a sub-critical fluid, as known under reference R134A or R1234YF. Alternatively, the refrigerant may be a super-critical fluid, such as carbon dioxide, having the reference R744. The refrigerant circuit according to the invention is a closed circuit which implements a thermodynamic cycle, the first compression device and the second compression device are for example compressors, and the invention finds a very particular application when the first compression device and the second compression device are electric compressors with fixed displacement and variable speed. It is thus possible to control the thermal power of the circuit according to the invention, the first branch is formed in parallel with the second branch, from the viewpoint of the refrigerant, the main heat exchanger can be installed on the front face of the vehicle. This main heat exchanger can thus be used as a condenser or gas cooler in the case of a super-critical fluid, or as an evaporator when the circuit operates as a heat pump, the first heat exchanger is configured to thermally condition an electrical storage device of the vehicle. The first heat exchanger exchanges heat energy between the refrigerant and the electrical storage device of the vehicle either directly, i.e. by convection between the first heat exchanger and the electrical storage device, or indirectly via a heat-transfer fluid $100p$, said $100p$ being intended to carry the heat energy from the electrical storage device to the first heat exchanger. Therefore, it will be appreciated that the cooling of the electrical storage device can be indirect. Alternatively, the first heat exchanger may be in contact with the electrical storage device. In this case, the cooling of the electrical storage device is direct.

the circuit according to the invention may comprise a refrigerant accumulation device positioned in the portion of the second branch that is situated between the second heat exchanger and the second compression device, the first distance is greater than three-quarters of the first length, and the second distance is greater than three-quarters of the second length, the first distance is greater than 90% of the first length, and in that the second distance is greater than 90% of the second length, the first portion and the second portion comprise a common part which extends between the point of convergence and a single inlet for admitting refrigerant into the main heat exchanger, the first portion comprises a first part which extends between the outlet of the first compression device and the point of convergence, and the second portion comprises a second part which extends between the second outlet of the second compression device and the point of convergence, the circuit comprises a circuit element arranged as a "Y" the foot of which is made up of the common part and the arms of which are made up of the first part and of the second part, the circuit element connects the first compression device and the second compression device to the main heat exchanger, the first part has a first passage cross section, the second part has a second passage cross section and the common part has a third passage cross section, the third passage cross section being greater than or equal to the sum of the first passage cross section and of the second passage cross section, the first passage cross section, the second passage cross section and the third passage cross section correspond to an area, offered by the first part, the second part and the common part, respectively, through which the refrigerant can flow, these areas being considered orthogonally to the flow of refrigerant within these parts, the first length is equal to the first distance and in that the second length is equal to the second distance, it will be appreciated that, in this last embodiment, the common part is non-existent, the main heat exchanger comprises a first inlet in fluidic communication with the first portion and a second inlet in fluidic communication with the second portion, the point of convergence comprises the first inlet and the second inlet, the point of convergence is housed inside the main heat exchanger and more particularly downstream of the first inlet and of the second inlet according to a direction in which the refrigerant flows inside the main heat exchanger, the first portion and the second portion have no point in common and form mutually-parallel circuit portions, at least one pipe connects a first branch portion, situated between the first heat exchanger and the first compression device, to a second branch portion, situated between the second heat exchanger and the second compression device, the pipe comprises at least a control means controlling the circulation of the refrigerant in the pipe, the control means controlling the circulation of the refrigerant in the pipe comprises at least an expansion device for expanding the refrigerant, the control means controlling the circulation of the refrigerant in the pipe comprises a first nonreturn valve, the circuit comprises first piping running in parallel with the pipe,
the first piping comprises a second nonreturn valve.

Another subject matter of the present invention is a method for controlling the temperature of an electrical storage device of a motor vehicle, implementing such a refrigerant circuit, during which method the first compression device and the second compression device are activated simultaneously during rapid charging of the electrical storage device.

Other features, details and advantages of the invention will become more clearly apparent upon reading the description set out below for information purposes, with reference to the drawings, in which.

It should first of all be noted that the figures set out the invention in a detailed manner in order to implement the invention, it being, of course, possible for said figures to serve to better define the invention if necessary. These figures are schematic representations which illustrate how the circuit is made, what makes it up and how the refrigerant circulates within it. In particular, the circuit according to the invention chiefly comprises two devices for compressing the refrigerant, heat exchangers, expansion members, piping connecting each of these components, and optionally valves or check valves. The circuit may also be placed under the dependency of a controller which acts on certain of these components. The terms upstream and downstream used in the following description refer to the direction of circulation of the fluid in question, that is to say the refrigerant, an interior air flow sent into an interior of the vehicle or an exterior air flow external to the vehicle interior. The refrigerant FR is symbolized by an arrow which illustrates the direction of circulation of the latter in the piping in question. The solid lines illustrate a portion of the circuit where the refrigerant circulates, whereas the broken lines show an absence of circulation of the refrigerant.

Figure 1:
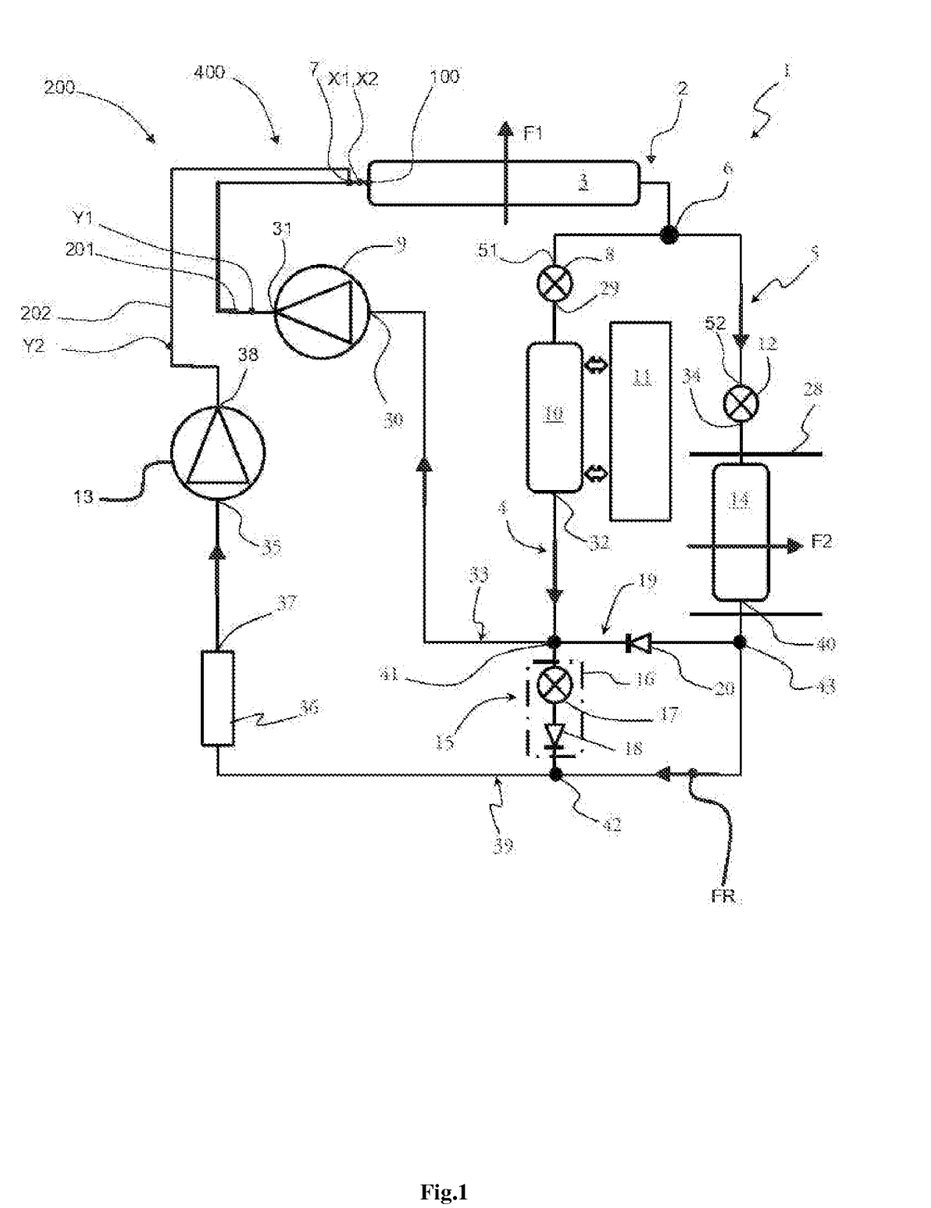
FIG. 1 is a schematic view of the circuit according to the invention, in a first embodiment.
Figure 2:
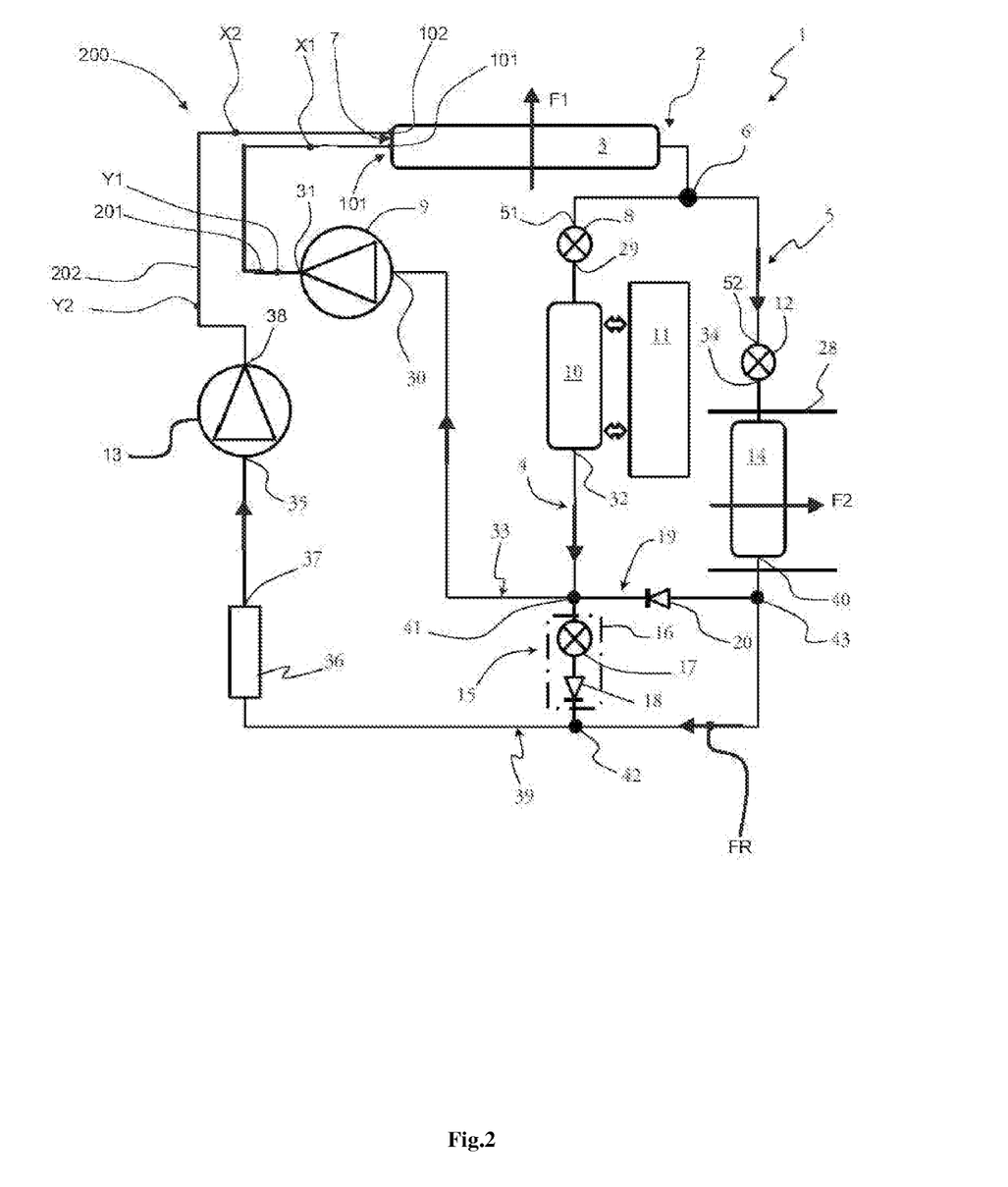
FIG. 2 is a schematic view of the circuit according to the invention, in a second embodiment.

FIGS. 1 and 2 thus depict a circuit 1 in which a refrigerant FR circulates. This circuit 1 is a closed 100p where the refrigerant FR is made to circulate by a first compression device 9 and/or by a second compression device 13. It will be noted that these compression devices 9, 13 can take the form of an electric compressor, that is to say a compressor which comprises a compression mechanism, an electric motor and possibly a controller. The rotation mechanism is rotated by the electric motor, the speed of rotation of which is controlled by the controller, which can be external or internal to the compression device concerned.

The circuit 1 comprises a main branch 2, a first branch 4 and a second branch 5 which are in series with the main branch 2 so as to form a closed circuit in which a thermodynamic cycle takes place.

The first branch 4 and the second branch 5 split at a point of divergence 6 and come back together again at a point of convergence 7. Between these two points, the first branch 4 and the second branch 5 are in parallel, from the viewpoint of the refrigerant FR.

The main branch 2 comprises a main heat exchanger 3. The latter is intended to have the refrigerant FR and a stream of exterior air F1 pass through it. This main heat exchanger 3 is the site of an exchange of heat energy between the refrigerant FR and this stream F1 of exterior air, and it may notably be used as a condenser. This main heat exchanger 3 may be installed on the front face of the vehicle equipped with the circuit 1 according to the invention and in such an instance has the flow F1 of air exterior to the vehicle interior pass through it.

The first branch 4 begins at the point of divergence 6 and ends at the point of convergence 7 and comprises in succession and in the direction of circulation of the refrigerant FR in the first branch 4, a first expansion member 8, a first heat exchanger 10 and the first compression device 9 for compressing the refrigerant FR. The first heat exchanger 10 is thus interposed between an outlet of the first expansion member 29 and an inlet of the first compression device 30.

This first heat exchanger 10 is specifically dedicated to the thermal management of an electrical storage device 11 the function of which is to supply electrical energy to one or more electric motors used to propel the vehicle. Such an electrical storage device 11 accumulates or releases this electrical energy in order to propel the motor vehicle, via the dedicated electric motor. It is, for example, a battery pack grouping several electrical cells which store electric current.

The first heat exchanger 10 exchanges heat energy directly with the electrical storage device 11, by convection or by conduction. This is then said to be direct thermal management of the electrical storage device 11.

In another alternative, the first heat exchanger 10 is thermally associated with the electrical storage device 11 via a heat-transfer fluid 100p. This is then said to be indirect thermal management of the electrical storage device 11. The heat-transfer fluid thus collects the heat energy from the electrical storage device 11 and transports it to the first heat exchanger 10.

The first expansion member 8 influences the thermal power used by the first heat exchanger 10, by being capable of varying this thermal power from the maximum power of the first heat exchanger 10 to any thermal power below this maximum power, notably by reducing the passage cross section for the refrigerant in the first expansion member 8. The first expansion member 8 is either a thermostatic expansion valve, an electronic expansion valve, an orifice tube or the like.

The inlet of the first compression device 30 is connected to an outlet of the first heat exchanger 32. An outlet of the first compression device 31 is itself connected to the point of convergence 7.

The first branch 4 of the circuit 1 also comprises a first branch portion 33 which extends between the first heat exchanger 10, more particularly the outlet of the first heat exchanger 32, and the first compression device 9, notably the inlet of the first compression device 30.

The second branch 5 begins at the point of divergence 6 and ends at the point of convergence 7 and comprises in succession and in the direction of circulation of the refrigerant FR in the second branch 5, a second expansion member 12, a second heat exchanger 14, a refrigerant accumulation device 36 and the second compression device 13 for compressing the refrigerant FR. The second heat exchanger 14 and the accumulation device 36 are thus interposed between an outlet of the second expansion member 34 and an inlet of the second compression device 35, the second heat exchanger 14 being positioned upstream of the accumulation device 36, from the viewpoint of the refrigerant FR. The accumulation device 36 may take the form of an accumulator, where the liquid phase contained in the refrigerant FR accumulates in the accumulator, and where the gaseous phase of this same refrigerant FR is drawn off by the second compression device 13. Alternatively, the accumulation device 36 may be a desiccating canister which may advantageously be incorporated into the main heat exchanger 3.

The second heat exchanger 14 is intended to thermally treat an interior air flow F2 which is sent into the vehicle interior. The second heat exchanger 14 may be installed inside a heating, ventilation and/or air-conditioning installation 28 which collaborates with the circuit 1, to form a thermal conditioning system for the motor vehicle. This second heat exchanger 14 may therefore be used as an evaporator to cool the flow F2 of interior air which is sent into the interior of the vehicle.

The second expansion member 12 acts on the thermal power employed by the second heat exchanger 14 by being capable of varying this thermal power in order to achieve more or less cooling of the flow F2 of interior air sent into the vehicle interior. The second expansion member 12 is either a thermostatic expansion valve, an electronic expansion valve, an orifice tube or the like.

The inlet of the second compression device 35 is connected to an outlet of the accumulation device 37. The second compression device 13 also comprises an outlet of the second compression device 38 which outlet is connected to the point of convergence 7.

The second branch 5 of the circuit 1 also comprises a second branch portion 39 which extends between the second heat exchanger 14, more particularly an outlet of the second heat exchanger 40, and the second compression device 13, notably the inlet of the second compression device 35. The accumulation device 36 may be positioned in this second branch portion 39.

Such a circuit 1 comprises a high-pressure line 200 which extends between, on the one hand, the outlet of the first compression device 31 and the outlet of the second compression device 38 and, on the other hand, an inlet of the first expansion member 51 and an inlet of the second expansion member 52. Inside the high-pressure line 200, the refrigerant FR is subjected to a high pressure because of its being compressed inside the compression devices 9, 13.

More particularly, the high-pressure line 200 comprises a first portion 201 extending between the outlet of the first compression device 31 and an inlet of the main heat exchanger 100, 101, 102. The first portion 201 is of a first length X1, measured between the outlet of the first compression device 31 and the inlet of the main heat exchanger 100, 101, 102.

More particularly still, the high-pressure line 200 comprises a second portion 202 extending between the outlet of the second compression device 38 and the inlet of the main heat exchanger 100, 101, 102. The second portion 202 is of a second length X2, measured between the outlet of the second compression device 38 and the inlet of the main heat exchanger 100, 101, 102.

Furthermore, a first distance Y1 separates the outlet of the first compression device 31 from the point of convergence 7, and a second distance Y2 separates the outlet of the second compression device 38 from the point of convergence 7.

The present invention advantageously proposes that the first distance Y1 be greater than half the first length X1, and in that the second distance Y2 be greater than half the second length X2.

It will be appreciated that the point of convergence 7 is closer to the inlet 100, 101, 102 via which the refrigerant FR enters the main heat exchanger 3 than to the outlet of the first compression device 31 and/or than to the outlet of the second compression device 38.

Such proximity makes it possible to minimize the pressure drops experienced by the refrigerant FR between the compression devices 9, 13 and the main heat exchanger 3, and to maintain within the first portion 201 and the second portion 202 a pressure lower than a threshold pressure, typically of the order of 27 bar. It will be appreciated that the shorter a common part of the piping between, on the one hand, the first compression device 9 and the main heat exchanger 3 and, on the other hand, the second compression device 13 and the main heat exchanger 3, the lower these pressure drops will be. As a result of this, the part common to the two portions 201, 202 has a length that is as short as possible. The present invention therefore proposes to make this common part as small as possible, or even, in one of these embodiments, to render it non-existent. Thus, pressure drops are reduced. The risk of having to reduce the capacity of the refrigeration 100p as a result of too high a value for the high pressure at the outlet of one of the two compressors is thus reduced. The cooling performance is thus improved.

Figure 3:
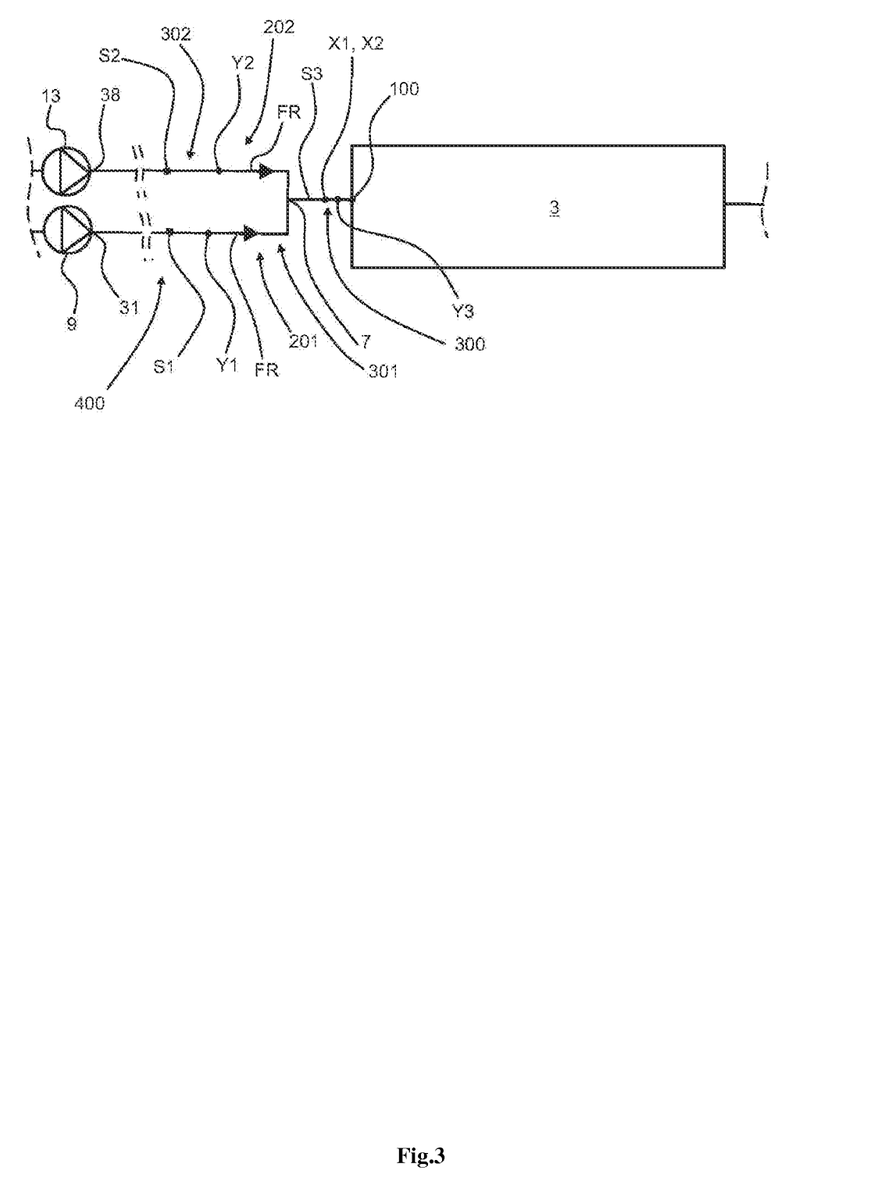
FIG. 3 is a schematic view of a detail of the circuit illustrated in FIG. 1.

According to a first embodiment variant illustrated in FIGS. 1 and 3, the first distance Y1 is preferably greater than three-quarters of the first length X1 and the second distance Y2 is preferably greater than three-quarters of the second length X2.

As a further preference, the first distance Y1 is greater than 90% of the first length X1 and the second distance Y2 is greater than 90% of the second length X2.

In this variant, the first portion 201 and the second portion 202 comprise a common part 300 which extends between the point of convergence 7 and a single inlet 100 for admitting refrigerant FR into the main heat exchanger 3. A third distance Y3 separates the point of convergence 7 and the single inlet 100 admitting refrigerant FR into the main heat exchanger 3. The common part 300 is therefore of a length equivalent to this third distance Y3, which in this variant is non-zero but is as short as possible in order to minimize pressure drops. The present invention thus proposes that the common part 300 be as short as possible so that the pressure drops are minimized and so that the pressure prevailing inside the common part remains below the threshold pressure.

It will be noted that, according to this variant, the first length X1 is equal to the sum of the first distance Y1 and of the third distance $Y_3$. It will also be noted that, according to this variant, the second length X2 is equal to the sum of the second distance Y2 and of the third distance Y3.

The first portion 201 comprises a first part 301 that extends between the outlet of the first compression device 31 and the point of convergence 7. The first part 301 is of a length corresponding to the first distance Y1. The second portion 202 comprises a second part 302 that extends between the second outlet of the second compression device 38 and the point of convergence 7. The second part 302 is of a length corresponding to the second distance Y2.

It will be appreciated that the circuit 1 comprises a circuit element 400 arranged as a "Y" the foot of which is made up of the common part 300 and the arms of which are made up of the first part 301 and of the second part 302. The circuit element 400 connects the first compression device 9 and the second compression device 13 to the main heat exchanger 3.

In this variant, with the first part 301 having a first passage cross section S1, the second part 302 having a second passage cross section S2 and the common part 30o having a third passage cross section $S_3$, the third passage cross section $S_3$ is advantageously greater than or equal to the sum of the first passage cross section S1 and of the second passage cross section S2, in order to reduce the pressure drops that the refrigerant FR is liable to experience inside the common part 300. The first passage cross section S1, the second passage cross section S2 and the third passage cross section S3 are defined as being an area, offered by the first part 301, the second part 302 and the common part 300, respectively, to the refrigerant FR for it to flow through these parts 300, 301, 302, these areas being considered orthogonally to the flow of refrigerant FR within these parts 300, 301, 302.

Figure 4:
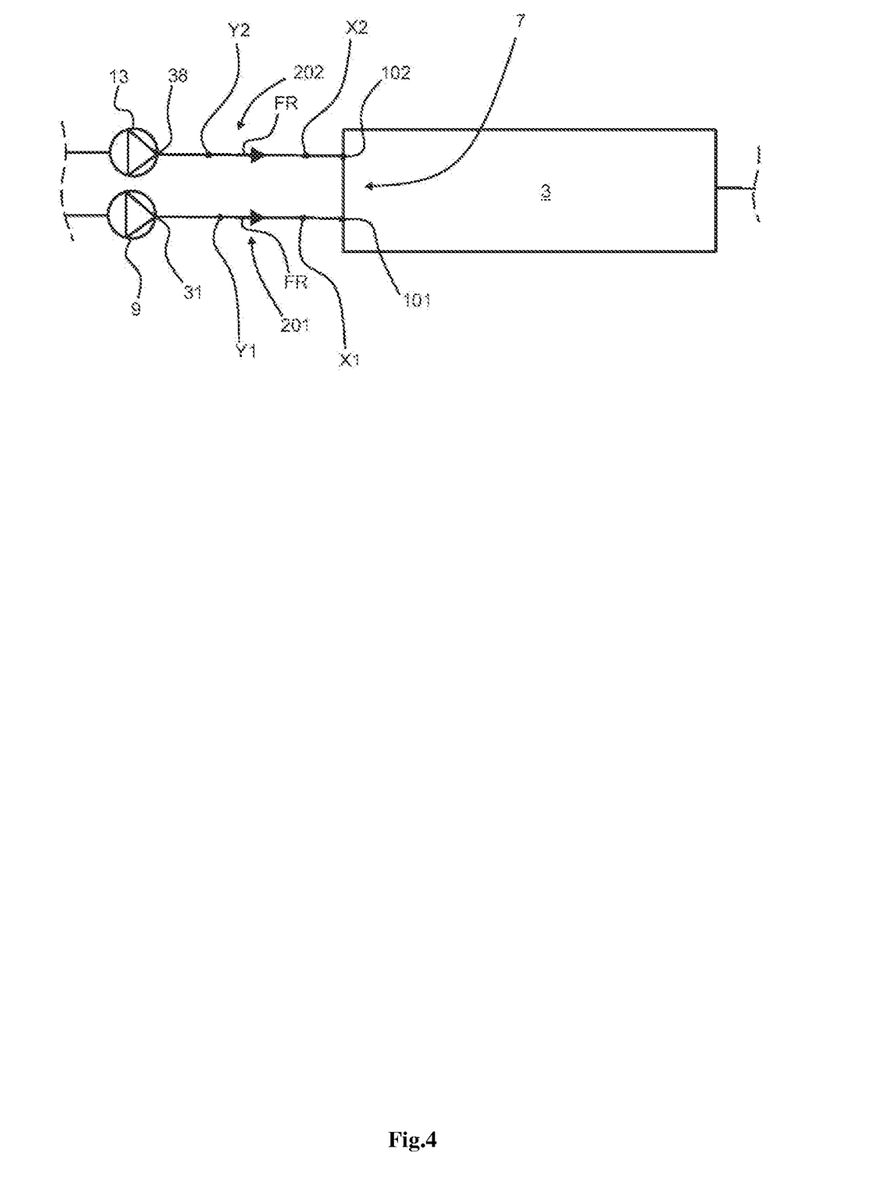
FIG. 4 is a schematic view of a detail of the circuit illustrated in FIG. 2.

According to a second embodiment variant illustrated in FIGS. 2 and 4, the first length X1 is equal to the first distance Y1 and the second length X2 is equal to the second distance Y2. In other words, the distance separating the outlet of any one of the compression devices 9, 13 is equal to the distance separating this outlet of the compression device 9, 13 from the inlet of the main heat exchanger 100, 101, 102.

In that case, the first portion 201 and the second portion 202 have no common part and are arranged in two parallel and independent lines, the first portion 201 connecting the outlet of the first compression device 31 to a first inlet 101 of the main heat exchanger 3, and the second portion 202 connecting the outlet of the second compression device 38 to a second inlet 102 of the main heat exchanger 3.

In this configuration, the point of convergence 7 is situated downstream of the first inlet 101 and of the second inlet 102, the point of convergence 7 being the point on the circuit 1 at which the refrigerant FR coming from the first compression device 9 and the refrigerant FR coming from the second compression device 13 mix together. It will be appreciated that, in this variant, the point of convergence 7 is likely to be housed inside the main heat exchanger 3.

According to another aspect of the invention, visible in FIGS. 1 and 2, the circuit 1 comprises at least one pipe 15 which fluidically connects the first branch portion 33 to the second branch portion 39. Such a pipe 15 allows the first branch 4 and the second branch 5 to be placed in communication thus offering the possibility of sharing the use of the two compression devices 9, 13 when the vehicle is in a rapid charging situation and at the same time the occupants of this vehicle are also demanding cooling of the air sent into the vehicle interior.

The pipe 15 is thus connected to a first point 41 situated in the first branch portion 33 and to a second point 42 situated in the second branch portion 39.

The circulation of the refrigerant FR in the pipe 15 can be controlled. Thus, the pipe 15 may comprise a control means 16 controlling the circulation of the refrigerant FR in the pipe 15. This control means 16 may comprise or consist of an expansion device 17 the function of which is either to close the pipe 15 or to open it fully, or to implement a pressure drop so as to cause the expansion of the refrigerant FR.

Cumulatively, the control means 16 controlling the circulation of the refrigerant FR in the pipe 15 may comprise a first nonreturn valve 18. The latter thus allows the refrigerant FR to circulate from the first branch portion 33 toward the second branch portion 39, and prevents such circulation in the opposite direction, namely from the second branch portion 39 toward the first branch portion 33.

The circuit 1 may also comprise first piping 19 running in parallel with the pipe 15, from the viewpoint of the refrigerant FR. The first piping 19 thus extends from the second branch portion 39 to the first branch portion 33. The first piping 19 extends between a third point 43 situated in the second branch portion 39 and the first point 41.

The first piping 19 may comprise a second nonreturn valve 20. The latter thus allows the refrigerant FR to circulate from the second branch portion 39 toward the first branch portion 33, and prevents such circulation in the opposite direction, namely from the first branch portion 33 toward the second branch portion 39.

The circuit 1 can be used in a mode providing simultaneous cooling of the electrical storage device 11 and of the vehicle interior. This is notably the case when rapid charging is being applied to the electrical storage device 11 while the occupants remain inside the vehicle during this rapid-charging time.

In such a mode, the two compression devices 9 and 13 are in operation and compress the refrigerant FR. These two compression devices 9, 13 which are thus shared make it possible to deliver the refrigeration power needed for cooling the vehicle interior and the electrical storage device 11 without causing noise pollution, for example. The main heat exchanger 3 discharges the heat energy from the refrigerant FR into the stream F1 of exterior air. The refrigerant FR then circulates both in the first branch 4 and in the second branch 5.

The first expansion member 8 expands the refrigerant FR and the first heat exchanger 10 cools the thermal storage device 11. The refrigerant FR is drawn in by the first compression device 9. On the side of the second branch 5, the second expansion member 12 expands the refrigerant FR and the second heat exchanger 14 cools the flow F2 of interior air sent into the vehicle interior. The refrigerant FR that leaves the second heat exchanger 14 is then drawn in by the second compression device 13 after having passed through the accumulation device 36.

In this mode of simultaneous cooling of the vehicle interior and of the thermal storage device 11, the pipe 15 may have part of the refrigerant FR that leaves the first heat exchanger 10 passing through it, this part then reaching the portion 39 of the second branch 5. The second compression device 13 thus compresses a quantity of refrigerant FR that corresponds to the sum of the refrigerant leaving the second heat exchanger 14 plus the proportion of refrigerant passing through the pipe 15.

The expansion device 17 performs an expansion that governs the flowrate of the refrigerant that is directed toward the first compression device 9 with respect to the proportion of refrigerant that circulates in the pipe 15. Such a setup relieves the burden of work of the first compression device 9 by sending some of the refrigerant which has cooled the electrical storage device 11 to the second compression device 13. Such a setup makes it possible to reduce the size of the first compression device 9 and/or to reduce the rotational speed thereof. Reducing rotational speed of the first compression device 9 thus makes it possible to reduce the noise it generates. In other words, acoustic comfort is improved.

It will be appreciated that other modes of operation can be applied to the circuit 1 of the present invention, the main features of which are illustrated in FIGS. 3 and 4, the architecture of the circuit 1 being moreover able to be more complex than those illustrated in FIGS. 1 and 2.

It will advantageously be noted that a method for controlling the temperature of the electrical storage device 11, that implements such a refrigerant FR circuit 1, is a method during the course of which the first compression device 9 and the second compression device 13 are activated simultaneously during rapid charging of the electrical storage device 11.

It will be appreciated from the foregoing that the present invention thus makes it possible to ensure simply, at optimized cost, without excess consumption and at a reduced noise level, the thermal treatment, by heating or by cooling, of an electrical storage device such as a battery or battery pack configured to supply electrical energy to an electric drive motor of the vehicle, as well as the thermal treatment of a vehicle interior by heating or by cooling a flow of interior air sent into the vehicle interior.

The invention is not limited to the means and configurations described and illustrated herein, however, but also extends to all equivalent means or configurations and to any technically functional combination of such means. In particular, the architecture of the refrigerant circuit can be modified without harming the invention insofar as it fulfills the functionalities described in this document.

The invention claimed is:

1. A circuit for a motor vehicle configured to have a refrigerant running through it, the circuit comprising:
    at least a main branch comprising at least a main heat exchanger having at least one inlet for refrigerant;
    a first branch and a second branch which extend between a point of divergence and a point of convergence and which are both positioned in series with the main branch,
    the first branch comprising at least a first compression device, a first expansion member and a first heat exchanger which is configured to thermally condition an electrical storage device of the vehicle,
    the second branch comprising at least a second compression device, a second expansion member and a second heat exchanger configured to thermally condition an interior of the vehicle; and
    a high-pressure line which comprises a first portion extending between an outlet of the first compression device and the at least one inlet of the main heat exchanger and which comprises a second portion extending between an outlet of the second compression device and the at least one inlet of the main heat exchanger,
    the first portion being of a first length and the second portion being of a second length, a first distance separating the outlet of the first compression device from the point of convergence and a second distance separating the outlet of the second compression device from the point of convergence,
    wherein the first length is equal to the first distance, and the second length is equal to the second distance,
    wherein the at least one inlet of the main heat exchanger comprises two inlets, a first inlet having independent fluid communication with the first portion separate from the second portion, and a second inlet having independent fluid communication with the second portion separate from the first portion,
    wherein the point of convergence is housed inside the main heat exchanger.

2. The circuit as claimed in claim 1, wherein at least one pipe connects a first branch portion, situated between the first heat exchanger and the first compression device to a second branch portion, situated between the second heat exchanger and the second compression device.

3. A method for controlling the temperature of an electrical storage device of a motor vehicle, implementing a refrigerant circuit as claimed in claim 1, during which method the first compression device and the second compression device are activated simultaneously during rapid charging of the electrical storage device.

\* \* \* \* \*